July 24, 1962     W. KITTEL     3,045,989

CONTACT PLATE ARRANGEMENT FOR CONTACT COLUMNS

Filed May 18, 1959     4 Sheets-Sheet 1

July 24, 1962 W. KITTEL 3,045,989
CONTACT PLATE ARRANGEMENT FOR CONTACT COLUMNS
Filed May 18, 1959 4 Sheets-Sheet 2

July 24, 1962 W. KITTEL 3,045,989
CONTACT PLATE ARRANGEMENT FOR CONTACT COLUMNS
Filed May 18, 1959 4 Sheets-Sheet 3

July 24, 1962 W. KITTEL 3,045,989
CONTACT PLATE ARRANGEMENT FOR CONTACT COLUMNS
Filed May 18, 1959 4 Sheets-Sheet 4

United States Patent Office 3,045,989
Patented July 24, 1962

3,045,989
CONTACT PLATE ARRANGEMENT FOR
CONTACT COLUMNS
Walter Kittel, Rhenaniastrasse, Mannheim, Germany
Filed May 18, 1959, Ser. No. 813,988
Claims priority, application Austria May 31, 1958
3 Claims. (Cl. 261—114)

This invention relates to gas-liquid contactors and is more particularly directed to a contact plate structure for use in rectifying columns, contacting columns, distilling columns, absorption columns, washing towers and the like structures of the kind, wherein a body of liquid moves downwardly through the vertically disposed column to come into intimate contact with gases rising within the column.

It is a primary object of this invention to provide a contact plate structure for columns or towers of the kind referred to which allows for contact between the liquid and the rising gas to an extent not attainable by known contact plate structures.

A further object of the invention is the provision of a contact plate structure, wherein intimate contact between gas and the entire liquid body is assured over substantially the entire area of the plates.

Figure 1:
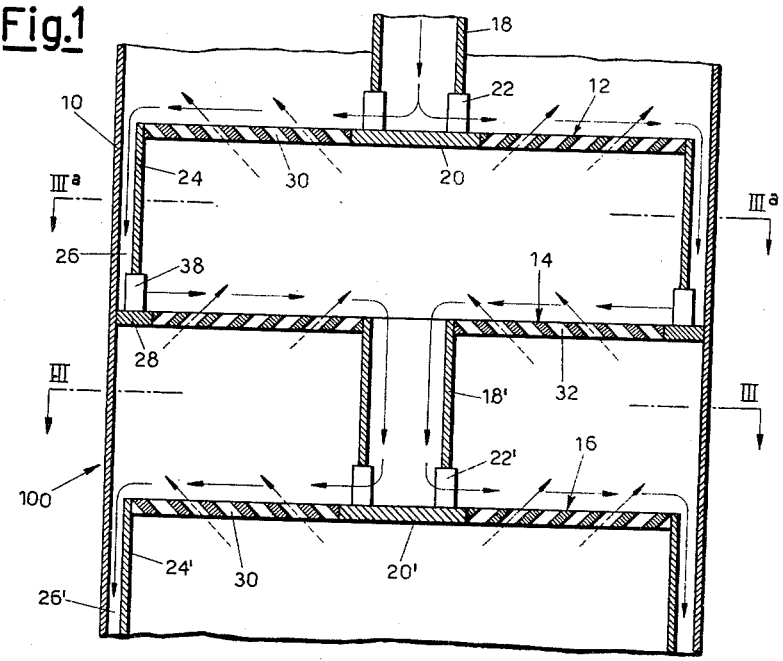
Figure 2:
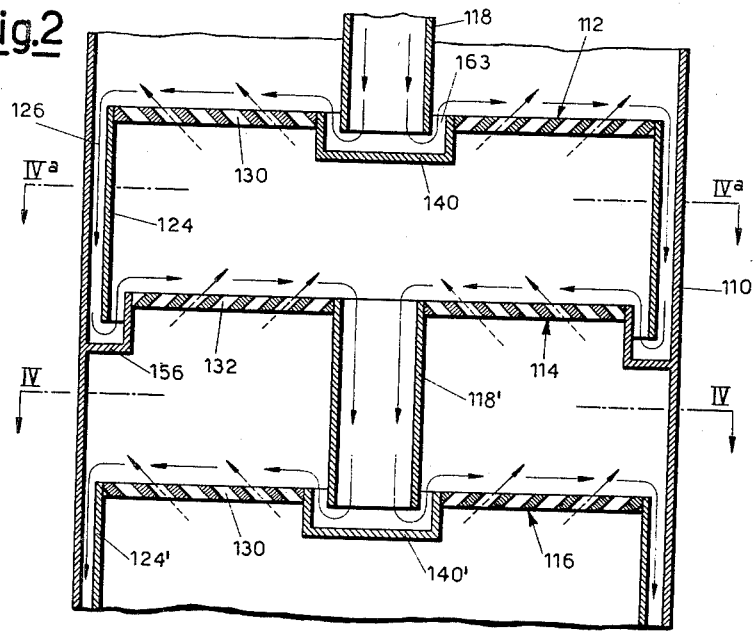
Figure 3A:
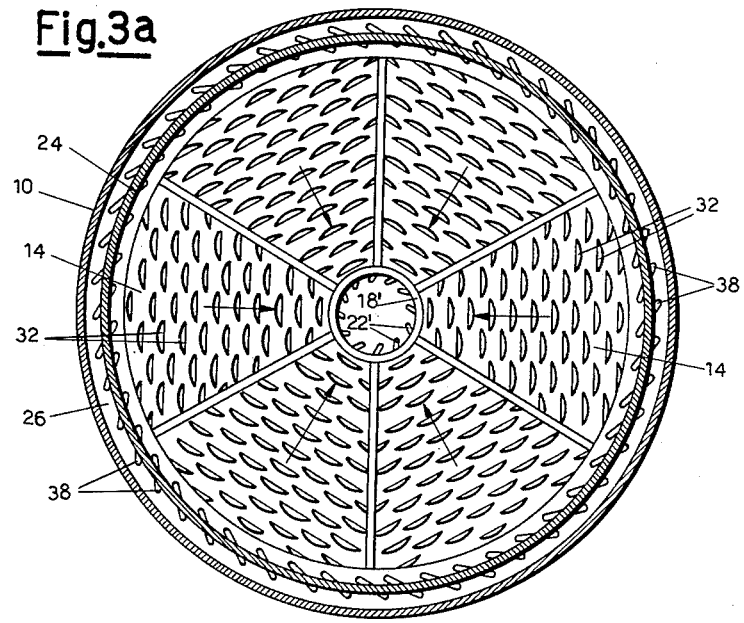
Figure 3:
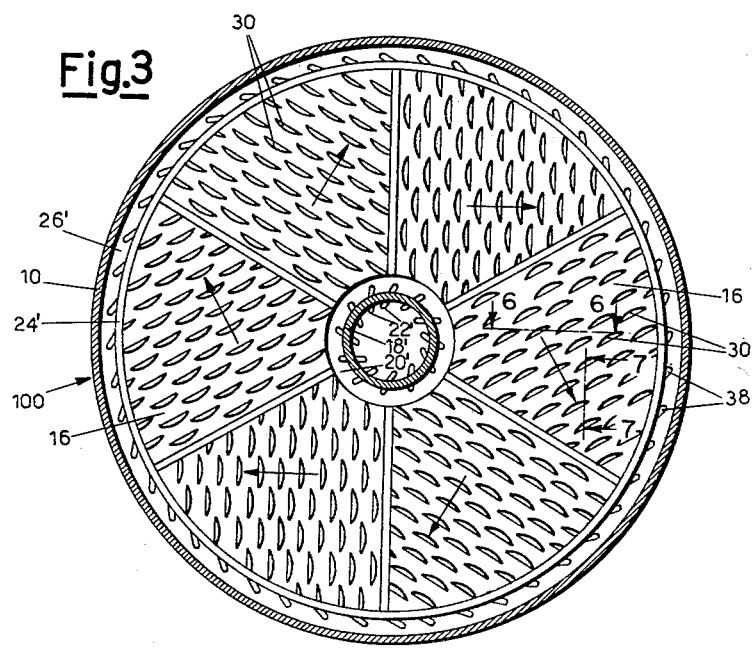
Figure 4A:
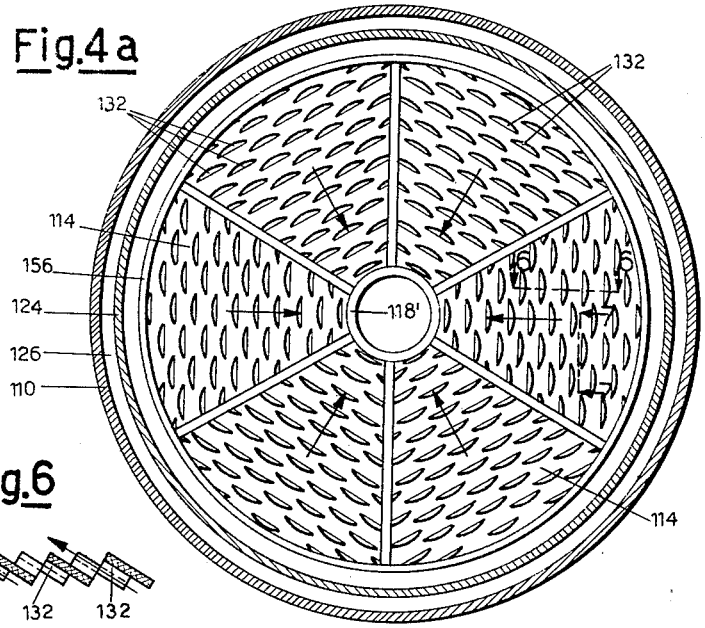
Figure 6:
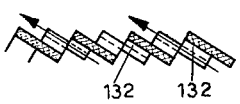
Figure 7:
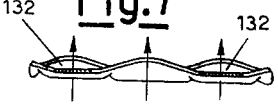
Figure 4:
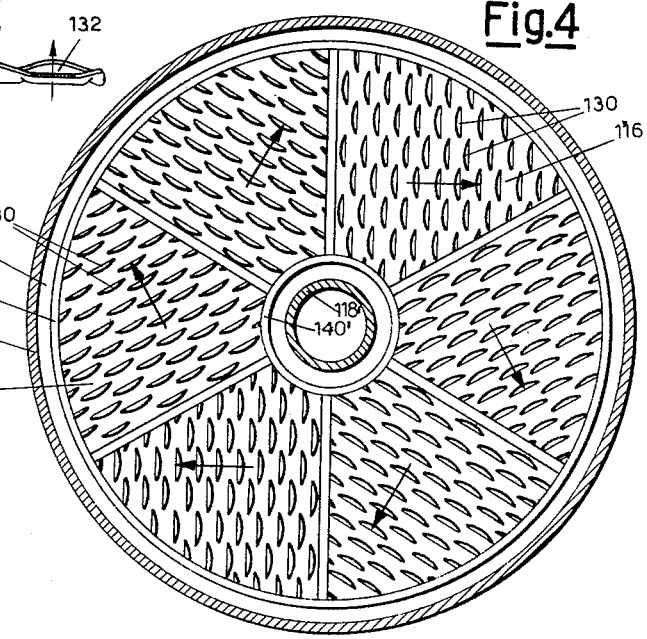
Figure 5A:
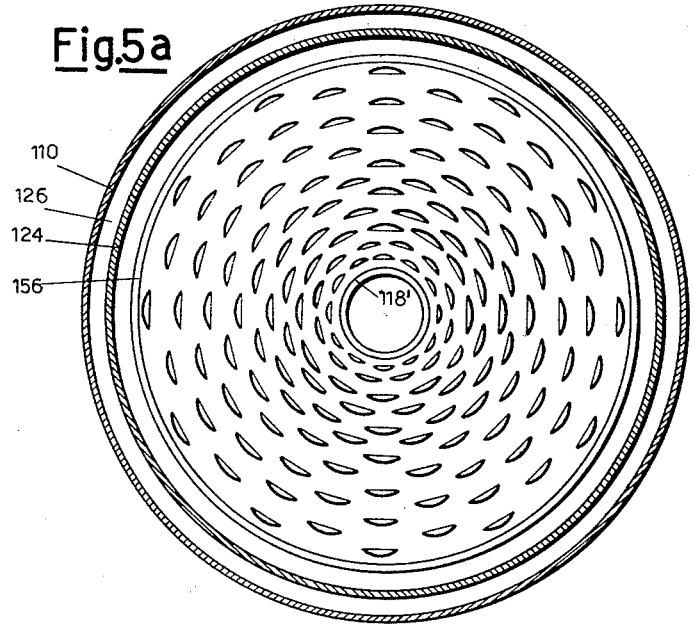
Figure 5:
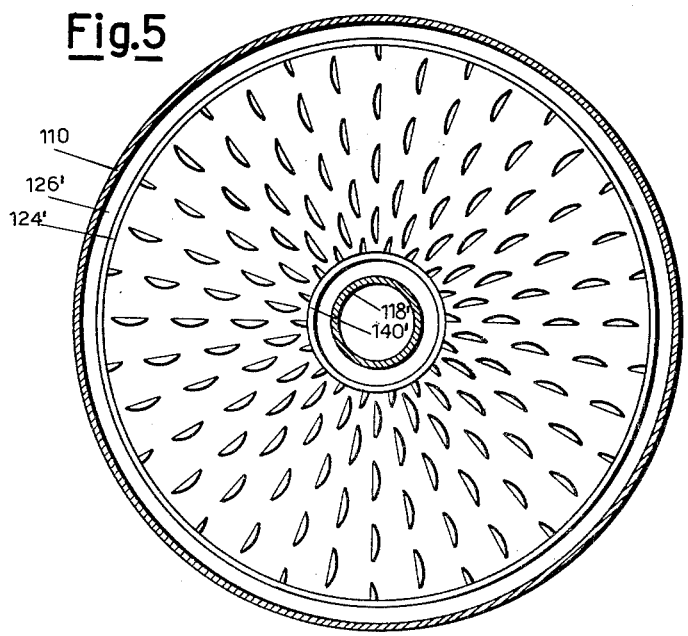

These and other objects and structural details of the invention will become apparent from the following detailed description when read in conjunction with the accompanying drawings forming part of this specification, wherein, FIG. 1 shows a portion, in vertical section, of a column fitted with one embodiment of the inventive contact plate structure, FIG. 2 shows a portion, in vertical section, of a column fitted with another embodiment of the inventive contact plate structure, FIG. 3a is a plan view along line IIIa—IIIa of FIG. 1, FIG. 3 is a plan view along line III—III of FIG. 1, FIG. 4a is a plan view along line IVa—IVa of FIG. 2, FIG. 4 is a plan view along line IV—IV of FIG. 2, FIGS. 5 and 5a are plan views of the nature shown in FIGS. 4a and 4, respectively, the plates proper, however, having differently arranged slots, FIG. 6 is a section taken along the plane 6—6 of FIG. 3 and FIG. 7 is a section taken along the plane 7—7 of FIG. 3.

It is generally known and appreciated in the art that the gas which rises in a gas-liquid contactor having several slotted superimposed contact plates transfers kinetic energy to the liquid flowing in counter current above the plates when the gas emerges from the slots or passages. The rising gases thus cause an appreciable flow resistance. The kinetic energy of the rising gases transferred to the downwardly moving liquid is advantageously utilized by causing it to impart to the liquid a predetermined desired flow path through the column. This is ordinarily accomplished by orienting the slots in the plates through which the gas rises.

In a known construction the flow of the liquid is directed and controlled by providing pairs of superimposed contact plates, each pair having an upper and a lower plate, also referred to as upper and lower hurdles. The slots of the upper plates in the arrangement referred to are arranged around the center axis of the plate in such a manner that a rotational movement is imparted to the liquid on these plates by the gas passing through the slots. Owing to centrifugal force the liquid is thus thrown towards the periphery of the upper plates. The slots or gas passages provided in the lower plates of the pairs referred to are, on the other hand, oriented radially towards the center axis of the plates, so that liquid flowing onto the peripheral area of the bottom plates is urged by the rising gases towards the center zone of the plates.

By operating in this manner the flow conditions on the individual plates are established to such an extent that the liquid may be allowed to trickle directly through the individual plates without thereby endangering the uniform and proper functioning of the several plates. This also holds true if, as has been proposed, the individual plates are subdivided into several e.g. pie-shaped, sectors, wherein each sector has a multitude of slots parallel to each other. The construction hereintofore described thus replaces the ordinary plate structures in columns, wherein the liquid is caused to flow from an intake zone to a discharge zone and is traversed between these two zones in substantially vertical direction by the rising gases, and provides instead plate pairs, the plates of which mutually cooperate and compensate each other with regard to the resulting liquid flow control by alternating centrifugal and centripetal action.

Plate pairs of the kind referred to can, however, be employed successfully only if two conditions are fulfilled, viz., (1) the column must have a relatively large flow cross-section, which is the sum of the area of all slot opening, and (2) the openings of the slots have to be formed with certain minimum dimensions, i.e., they have to be relatively large so as to avoid capillary action which may disrupt proper and uniform operation.

Applicant has carried out extensive research with plate pair constructions of the kind referred to and has ascertained that the required compliance with the two conditions results in an important and unsurmountable drawback, to wit, a substantial portion of the liquid trickling from an upper plate to a lower one, upon impinging on the latter one, is not caught or contacted by the gases rising through the slots of the lower plate, but falls directly through the slots of the lower plate as well. In other words, the desired intimate contact between liquid and gas is not accomplished with respect to a substantial portion of the liquid and the very purpose of the column is thus defeated. This in turn means that a large portion of the liquid does not take part in the desired radial to-and-fro movement during the flow of the liquid through the column, but instead trickles vertically through the column without being substantially contacted by the rising gases.

The construction of the present invention remedies the drawback of the known arrangement and assures intimate contact between the gases and the entire liquid body.

Briefly, and in accordance with this invention, the liquid is directed in such a manner that it flows towards and on the slotted plates in horizontal direction and, moreover, in a direction which substantially corresponds to the flow direction of the gases passing through the slots. In other words, the liquid does not impinge vertically on the plates but moves parallel to the longitudinal plane of the plates, the flow, furthermore, being substantially unidirectional with the rising gases with the contact zone above the plates.

Referring now to the drawings, and in particular to FIGS. 1 and 3a, reference numeral 10 indicates the outer confining wall of a contact column 100. Three contact plates 12, 14 and 16 are shown arranged within the space defined by the wall column 10. Upper plate 12 and lower plate 14 form a cooperating plate structure pair while plate 16 is the upper plate of the next plate pair. Obviously any number of pairs may be provided, depending on the height of the column, the spacing between them and the intended purpose to which the column is put. A downcomer or pipe 18 leading from the next higher plate (not shown) is arranged centrally above a circular plane baffle portion 20 of the plate 12. The pipe 18 terminates above the top surface of the plate 12, while element 22 is interposed between the baffle portion 20 and the pipe 18. The element 22 comprises guide vanes or fins with openings formed therebetween. The diameter of plate 12 is somewhat smaller than that of the column 100. A cylindrical structure 24 is joined to the edge of plate 12 and extends concentrically relative to the column wall 10 so as to form a narrow annular space 26. The lower plate 14 of the plate pair extends across the entire cross-section of the column and has a solid circumferential baffle edge portion 28. The cylindrical structure 24 terminates slightly above the plate 14. A guide vane-comprising, opening-forming element 38, similar to element 22, is situated between the lower edge of cylinder 24 and the solid circumferential baffle portion 28 of the plate 14. Plate 14 has a central opening into which is fitted the next downcomer or pipe 18'. The structure of plate 16 is identical with that of plate 12, i.e., it comprises a baffle portion 20', on which is mounted an opening-forming guide or re-directing element 22', while a cylinder 24' is joined to the edge of plate 16 to form an annular space 26' with the column wall 10 and to lead down to the next plate (not shown).

The structure of plates 12 and 16 is schematically indicated in FIG. 3, while FIGURE 3a illustrates the structure of plate 14. It will be observed that each plate is composed of six pie-shaped sectors which are joined together to form the circular plates. Each sector has a plurality of inclined slots or gas passages which extend parallel to each other. The inclination or orientation of all the slots 30 of plates 12 and 16, as shown in FIG. 3, is tangentially outwardly and away from the center of the column, while all the slots 32 of plate 14, as in FIG. 3a, point in the opposite direction, i.e., radially towards the center.

The operation of the device is as follows: Liquid is fed into the vertically disposed column 100 at the top thereof, while gases are permitted to rise within the column from the bottom thereof. The flow of the liquid and gas is indicated by the arrows. The liquid flows vertically through the centrally arranged downcomer 18 and by the cooperation of the baffle portion 20 and the guide vane comprising element 22 is forced and directed to flow horizontally across the plate 12 towards the annular space 26, similar to the flow in FIG. 3. During its travel across the plate 12, the liquid is obliquely traversed and positively driven by the gases which pass through the slots 30. The top of the plates thus constitutes the contact zone proper. It will be noted that the slots 30 are oriented outwardly so that the gases emerging through the slots flow substantially unidirectionally with the liquid to urge the latter towards the circumference of the plate 12. In fact, a rotational movement is imparted to the liquid by the gases, urging the former towards the circumference. The liquid drops thereafter through the annular space 26 to be deflected by the cooperating baffle element 28 and element 38 so as to flow horizontally across the plate 14 towards the center thereof, as in FIGS. 1 and 3a. The slots 32 of plate 14 are inclined radially towards the center so that again the flow direction of the gases and the liquid is substantially unidirectional and the liquid is traversed and positively driven by the rising gases towards the center. The liquid then falls through downcomer 18' to flow thereafter horizontally across the plate 16 while being traversed and driven by the gases rising through the slots of plate 16.

From the above description it will have become apparent that the liquid performs a continuous to-and-fro movement across the column as it moves through the column, all of which is accomplished by the provision of the plates with their alternating central and circumferential downcoming arrangement and the rising gases which are guided by the slots in substantially the same direction as the flow direction of the liquid. The downcoming arrangement for the outwardly acting plates is the annular space between the column walls and the element 24 while the central downcomers are provided for the inwardly acting plates. The provision of the baffle elements 20 and 28 and of the guide vane comprising members 22 and 38 assures that the liquid enters onto the plates proper in completely horizontal direction and in uniform distribution and intensity. In this connection it might be stated that the guide vanes of element 22 through which the liquid passes from the inside towards the outside are advantageously inclined in conformity with the rotational movement taking place on the plates, while the guide vanes of elements 38, arranged on the circumference of the following plate, preferably are directed radially conforming to the flow conditions on that plate.

The embodiment according to FIGS. 2, 4 and 4a illustrates a column construction with a different downcoming arrangement. Again three plates 112, 114 and 116 are shown which are arranged within the column space defined by the confining wall 110. The construction of the plates and the orientation of the slots 130 and 132 are the same as in FIGS. 1 and 3. Cylindrical baffle pockets 140 and 140', respectively, are arranged in the center portion of the plates 112 and 116 into which project the lower end portions of downcomer pipes 118 and 118', respectively. The liquid flowing downwardly through the pipes 118 and 118', respectively, will thus collect within the pocket until it reaches the level of the top surface of the plate whereafter it flows over the edge of pockets 140, 140' and horizontally across the plate towards the circumference. It will be noted that the lower end portions of pipes 118 and 118' extend below the top surface level of the plates so that in fact these end portions dip into the liquid collecting in the baffle pockets 140, 140', forming an annular space 163 with the upright wall of the pocket 140 and thus assuring uniform flow of well distributed intensity. This arrangement accomplishes a similar result as the arrangement of elements 20 and 22 of FIGS. 1 and 3.

It should be pointed out, however, that the embodiment with guide vanes for the distribution and guidance of the liquid is from a practical point of view to be preferred to the embodiment of FIGS. 2, 4 and 4a, as the former is not affected by solid substances or contaminations which may be carried along by the liquid, while the pockets of FIGS. 2 and 4 may become clogged thereby.

The cylindrical structure 124 in turn extends below the level of plate 114 and into a pocket forming element 156. Liquid flowing through the annular space 126 will thus collect within the pocket 156 until it reaches the top surface level of plate 114, whereafter it flows over the edge of the pocket and across the plate. The arrangement of elements 156 and 124 is in principle the same as that of elements 118 and 140 and accomplishes a similar result as arrangement 28, 38 of FIGS. 1 and 3.

While the slots of the plates of FIGS. 3, 3a, 4a and 4 are parallel to each other in each of the six sections of the plates, FIGS. 5 and 5a illustrate a plate structure, wherein the slots extend alternatingly continuously tangentially or continuously radially relative to the center axis of plates. This embodiment has been included so as to facilitate the better understanding of the principles involved in the invention. From a practical or constructional point of view, however, the plate structure of FIGS. 5 and 5a has less importance, as it is difficult to manufacture plates of such design. For this reason plates composed of several sectors are preferred.

It should be observed that the downcoming arrangements of the present invention serve the sole purpose of causing the liquid to move downwardly to the next plate and to direct the liquid on to the plates horizontally and with uniform intensity. The flow direction and guidance of the liquid across the plates, however, is determined and accomplished by the rising gases emerging through the suitably oriented slots of the plates.

By contrast, in known downcoming arrangements which have been developed and are used for large liquid charges, the guide vanes proper impart to the liquid a rotational movement, while the kinetic energy of the gases in those instances is not sufficient to impart a desired flow direction to the liquid or appreciably to influence the existing flow conditions of the liquid. In these known constructions, the gas is guided unidirectionally relative to the liquid which, however, already performs a rotational movement, so that merely contact between gas and liquid and penetration by the gas through the liquid is achieved. The gas, however, does not positively drive the liquid so as to determine its flow direction in such prior devices.

According to the present invention, however, the desired flow conditions are exclusively produced on the plates proper by the kinetic energy of the rising gases emerging from the oriented slots. As has been shown in the introductory passages of this application, the kinetic energy of the liquid is in fact a liability for the present purpose and is therefore largely eliminated by means of the horizontally acting redirecting means, be they in the form of the guide vanes cooperating with the baffle surfaces (FIGS. 1 and 3) or in the form of pockets as shown in FIGS. 2 and 4. It will thus be realized that the orientation of the slots in the individual plates is of decisive importance for the proper functioning of the inventive arrangement. In this connection it is emphasized that the orientation of the slots on the plates having a central downcoming arrangement, i.e., the plates 14 and 114, has to be radially inwardly since a rotation of the liquid has to be absolutely avoided. That the orientation has to be radially inwardly can be illustrated by the formula $c_u \times r = \text{const.}$, wherein $c_u$ is the tangential velocity of the liquid and $r$ is the radius. If the orientation would not be radial, the angular velocity of and thus the centrifugal force in the liquid would increase to such an extent during its travel across the plate towards the central downcoming arrangement, that the liquid would not reach the rim of the downcomer but would rotate about it.

I have described preferred embodiments of my invention, but it is understood that this disclosure is for the purpose of illustration, and that various changes in shape and proportion, as well as the substitution of equivalent elements for those herein shown and described may be made without departing from the spirit and scope of the invention as set forth in the appended claims.

What I claim is:

1. A column or the like gas-liquid contactor wherein a downwardly moving liquid is brought into intimate contact with rising gases, comprising in combination: an upright cylindrical column wall defining a vertical flow space, a plurality of contact plate pairs horizontally arranged within said flow space above one another, each plate pair having an upper and a lower plate, the upper plate having a central solid baffle surface and a plurality of inclined gas passages distributed over the plate area, the inclination of said gas passages being towards said column wall, a cylindrical element joined at its upper end to the circumference of said upper plate flush therewith and extending downwardly coaxially with said column wall to enclose an annular space therewith, said cylindrical element terminating above the level of said lower plate, said lower plate having a central hole, a tubular member fitted in said hole flush with said lower plate and terminating above the central solid baffle surface of the upper plate of the next lower plate pair, said lower plate having a plurality of inclined gas passages distributed over the entire plate area, the inclination of said gas passages being radially toward the center of the column, said lower plate further having a circumferential solid baffle portion below said cylindrical element joined to the circumference of the lower plate flush therewith, a first guide vane comprising element interposed between the central baffle surface of the upper plate and the lower end of the tubular member, and a second guide vane comprising element interposed between the circumferential baffle portion of the lower plate and the lower end of said cylindrical element.

2. A column or the like gas-liquid contactor wherein a downwardly moving liquid is brought into intimate contact with rising gases, comprising in combination: an upright cylindrical column wall defining a vertical flow space, a plurality of contact plate pairs horizontally arranged within said flow space above one another, each plate pair having an upper and a lower plate, the upper plate having a central hole, a pocket forming solid baffle element in said hole joined to the upper plate flush therewith and extending slightly below the level of the upper plate, said upper plate having a plurality of inclined gas passages distributed over the plate area, the inclination of said gas passages being toward said column wall, a cylindrical element joined to the circumference of said upper plate flush therewith and extending coaxially with said column wall to enclose an annular space therewith, said cylindrical element terminating adjacent to and slightly below the level of the lower plate, said lower plate having a central hole, a tubular member fitted in said hole having its upper end flush with said lower plate and terminating slightly below the level of the upper plate of the next lower plate pair and within the space defined by the pocket forming baffle element thereof, said lower plate having a plurality of inclined gas passages distributed over the entire plate area, the inclination of said gas passages being radially toward the center of the column, and said lower plate further having a circumferential pocket forming solid baffle element below said cylindrical element and extending slightly below the level of the lower plate and joined to the circumference of the lower plate flush therewith.

3. In a device for bringing gases, vapors and liquids into intimate contact in a vertical flow space defined by an upright cylindrical column having substantially flat horizontal plates arranged in pairs in said column, said plates having slots inclined to the vertical and distributed over their surfaces for the upward passage of said vapors therethrough, means for discharging liquid from each of said plates to the plate therebelow, said liquid discharge means comprising an annular channel extending downwardly from the circumference of the upper plate of each of said pairs, a central discharge pipe extending downwardly from the center of the lower plate of each of said pairs, and baffles below said annular channel and said discharge pipe which are impervious to liquids and gases, the improvement wherein said slots of said upper plates are inclined and oriented outwardly in the same fluid rotational sense relative to a central axis of said plates, said slots of said lower plates being inclined and oriented radially toward said axis, whereby said vapors passing upwardly through said slots will impart said liquids a rotational and substantially centrifugal movement on said upper plates while imparting said liquids a substantially centripetal movement on said lower plates, whereby said liquids are urged towards and discharged at said annular channels on said upper plates and at said discharge pipe on said lower plates, and wherein said annular channel and said discharge pipe at their upper ends are flush with said plates, to enable said liquids to flow freely over all intended plate surfaces without restraint for all quantities and rates of flow.

References Cited in the file of this patent

UNITED STATES PATENTS 2,752,138    Kittel _____ June 26, 1956

FOREIGN PATENTS 518,215    Belgium _____ Mar. 31, 1953
669,862    Great Britain _____ Apr. 9, 1952
839,695    France _____ Jan. 7, 1939